US008135808B2

(12) United States Patent
Sterling et al.

(10) Patent No.: US 8,135,808 B2
(45) Date of Patent: Mar. 13, 2012

(54) AUTOMATED PROVISIONING SYSTEM

(75) Inventors: Keith Sterling, London (GB); Mark Pond, London (GB); David Jacobs, London (GB)

(73) Assignee: Jacobs Rimell Limited, London (GB)

( * ) Notice: Subject to any disclaimer, the term of this patent is extended or adjusted under 35 U.S.C. 154(b) by 607 days.

(21) Appl. No.: 11/915,774

(22) PCT Filed: Jun. 2, 2006

(86) PCT No.: PCT/GB2006/002039
§ 371 (c)(1),
(2), (4) Date: Oct. 13, 2008

(87) PCT Pub. No.: WO2006/129117
PCT Pub. Date: Dec. 7, 2006

(65) Prior Publication Data
US 2009/0172134 A1  Jul. 2, 2009

(30) Foreign Application Priority Data
Jun. 3, 2005  (GB) .................................. 0511372.5

(51) Int. Cl.
*G06F 15/177* (2006.01)
(52) U.S. Cl. .................... 709/220; 709/217; 370/463
(58) Field of Classification Search .................. 709/220, 709/217; 370/463
See application file for complete search history.

(56) References Cited

U.S. PATENT DOCUMENTS

| | | | | |
|---|---|---|---|---|
| 3,819,870 A | * | 6/1974 | Singhi et al. | 379/171 |
| 6,336,152 B1 | * | 1/2002 | Richman et al. | 710/8 |
| 6,513,049 B1 | * | 1/2003 | Moriyama | 707/769 |
| 7,116,679 B1 | * | 10/2006 | Ghahremani | 370/463 |
| 7,254,672 B1 | * | 8/2007 | Murray et al. | 711/112 |
| 7,274,931 B2 | * | 9/2007 | Harris | 455/419 |
| 7,293,272 B1 | * | 11/2007 | Okcu et al. | 719/327 |
| 7,380,140 B1 | * | 5/2008 | Weissman et al. | 713/193 |
| 7,475,123 B2 | * | 1/2009 | Schwarze | 709/217 |

(Continued)

FOREIGN PATENT DOCUMENTS

EP  0863678 A2  9/1998

(Continued)

OTHER PUBLICATIONS

Search Report from GB Application No. 0511372.5, dated Jul. 21, 2005.

(Continued)

*Primary Examiner* — Wing Chan
*Assistant Examiner* — Tesfay Yohannes
(74) *Attorney, Agent, or Firm* — Zilka-Kotab, PC

(57) ABSTRACT

An automated provisioning system for provisioning a service or device in a communications network, which system comprises a listener (2) adapted to receive a request from a user and a driver adapted to control operation of the service or device. The driver supports a describe operation, which enumerates which operations are available for the user and co-operates with a control processor (22), which mediates between the driver and a data store holding information on which operations are available for the user. When a request to provision an available operation is received, the control processor (22) mediates between the data store and driver to determine what information is required to provision the service or device and to permit the driver to provision the service or device. The system dispenses with the table driven approach of known systems.

9 Claims, 3 Drawing Sheets

U.S. PATENT DOCUMENTS

| | | | |
|---|---|---|---|
| 7,505,891 B2 * | 3/2009 | Lin | 703/27 |
| 7,664,771 B2 * | 2/2010 | Kusters et al. | 707/999.102 |
| 2002/0191014 A1 * | 12/2002 | Hsieh et al. | 345/738 |
| 2003/0126356 A1 * | 7/2003 | Gustavson et al. | 711/105 |
| 2004/0111629 A1 | 6/2004 | Kato et al. | |
| 2004/0226010 A1 * | 11/2004 | Suorsa | 717/174 |
| 2005/0050175 A1 | 3/2005 | Fong et al. | |
| 2005/0102353 A1 | 5/2005 | Murphy et al. | |
| 2005/0216421 A1 * | 9/2005 | Barry et al. | 705/64 |
| 2006/0218436 A1 * | 9/2006 | Cherian et al. | 714/6 |

FOREIGN PATENT DOCUMENTS

| | | |
|---|---|---|
| WO | 0215494 A1 | 2/2002 |
| WO | 02073944 A1 | 9/2002 |

OTHER PUBLICATIONS

International Search Report and Written Opinion from International Application No. PCT/GB2006/002039, dated Nov. 27, 2005.

* cited by examiner

AUTOMATED PROVISIONING SYSTEM

The invention relates to a provisioning system for use in and by service providers in telecommunications such as broadband telephony, cable television and the like.

Service providers of all types such as Internet Service Providers (ISPs), traditional telecommunication companies and cable television companies face the problem that they need to offer sophisticated but convenient services to their users. These services need to be offered more quickly than ever and at lower cost. Many customers both at an individual and business level are demanding better value in terms of greater personalisation and functionality. The ability to service activate new services and self provision new devices quickly would keep many customers happy.

Most present implementations of this type of next generation service are table driven and hence still manually delivered by the service provider and the resultant time, skills and money needs to key in the necessary data each and every time a service is created or changed means that services cannot be delivered as flexibly and rapidly as customers demand.

GB2354605 proposes an automated provisioning system adapted to use an LDAP or X.500 compatible directory enabled information repository. The system comprises a service manager adapted to interface with the information repository and components of a distributed electronic system such a cable television system or virtual ISP. In use, the service manager logs on when required to a directory and interacts therewith to create, delete, amend and/or search for information in the information repository. The service manager also interacts through a plurality of interfaces, with components and users of the distributed electronic system to enable authentication and authorization to use services running on the components of for example a cable television system.

However, whilst this automated provisioning system has addressed many of the issues of user controlled service activation, this system suffers from the problem that the interaction of the plurality of interfaces with the service manager requires skilled workers to change the self activated service provisioning offer of a service provider, thereby resulting in a cost overhead.

The present invention therefore seeks to provide a dynamic automated provisioning system to permit easier changes to service offerings by service providers.

According to the invention there is provided an automated provisioning system for provisioning a service or device in a communications network, the system comprising a listener adapted to receive a request from a user and a driver adapted to control operation of the service or device, wherein the driver supports a describe operation, which describe operation enumerates which operations are available for the user and the driver co-operates with a control processor, which control processor is adapted to mediate between the driver and a data store, which data store holds information on which operations are available for the user, wherein in the event of a request to provision an available operation being received, the control processor mediates between the data store and driver to determine what information is required to provision the service or device and to permit the driver to provision the service or device.

Preferably the control processor determines that the requested operation requires validation, then a server side validation of the request is made prior to actual provisioning. Preferably, the control processor determines if any values for the requested operation are reserved and instructs the driver to lock any reserved value or values prior to provisioning. Preferably, the status of the operation is returned by the driver to the control processor. Preferably, the request to the driver contains a specific meta-object defining the request, which meta-object is specific to the driver. Preferably, the information in the data store is modelled, which model comprises product objects and service objects and a configuration object linking the product and service objects, wherein the control processor uses the meta-object to locate the driver by means of an attribute of the configuration object.

The invention advantageously dispenses with the table driven arrangements of the prior art provisioning systems and provides for a standardised mechanism for each business operation that allows for dynamic inclusion of data and hence de-coupling of presentation logic from the back-end implementation. This results in faster provisioning at lower cost.

An exemplary embodiment of the invention will now be described in greater detail with reference to the drawing in which:

FIG. 1 shows a schematic of an architecture of an automated provisioning system, which can be broken down into three distinct sections: the service integration bus; the data model and storage and system administration.

Figure 1:
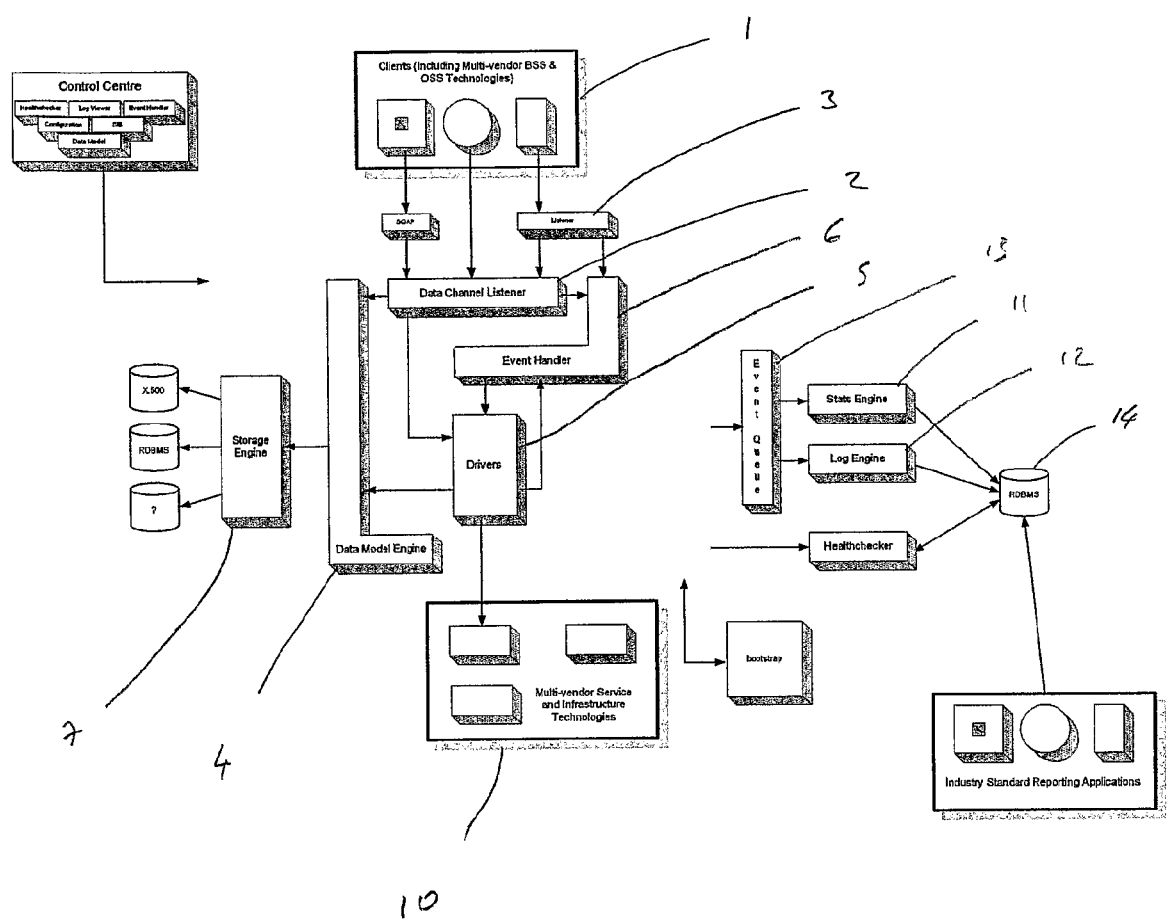
FIG. 1 shows an architecture of an automated provisioning system

Service providers who are clients of the system provide data requests or messages, generally designated 1, which can include multi vendor BSS and OSS Technologies, to a data channel listener 2. The data channel listener 2 is designed to natively support a number of protocols but should other protocols be used, these can be fed via a listener 3, which is a reusable component adapted to enable the reception of these protocols. The listener implements a protocol-specific interface and an interface to the service integration bus and thus acts as bridge between the two. The listener can either be internal, i.e. based on a J2EE compatible protocol such as JMS, simple object access protocols (SOAP), HTTP/POP or enterprise Java beans (EJB) or external such as SNMP or socket listeners. The data channel listener 2 is a stateless session EJB instance that provides a J2EE (Java 2 Enterprise Edition) entry point into the service integration bus for internal and external listeners and drivers, thereby acting as a central connection within the bus.

The data channel listener 3 is adapted to communicate with a data model engine 4, drivers 5 and an event handler 6. The data model engine 4 provides an abstraction layer thereby permitting other components to be hidden from the make up and location of the data within the model. It implements a set of operations that allow components to access data stored in the model. As it is implemented as a component driver, messages can be sent to it via the service integration bus. The data model engine therefore communicates with a storage engine 7, which in turn abstracts the details of storage away from the data model and provides a storage agnostic interface. The data can be stored either in a relational database or in an LDAP or X.500 compatible directory. An example of a good data model can be found in GB2368692., which describes a model in which the service elements are broken down into discrete objects including communities (domains), customers (users), products (profiles), services and infrastructure. Configuration objects are provided to link these certain objects with certain other objects such as a product service configuration object to facilitate the manipulation of the main objects.

The drivers 5 are adapted to interact with the data model engine 4, the event handler 5 and with the service and infrastructure technologies 10 of the service providers. The event handlers 5 can also interact with the drivers 5 and also with the listener 3 in additional to the data channel listener 2 previously described. Various administrative tools are provided such as a stats engine 11 and log engine 12, to which data is queued via an event queue 13, the results of which can be stored in a database 14. Control applications 14 are also provided.

Figure 2:
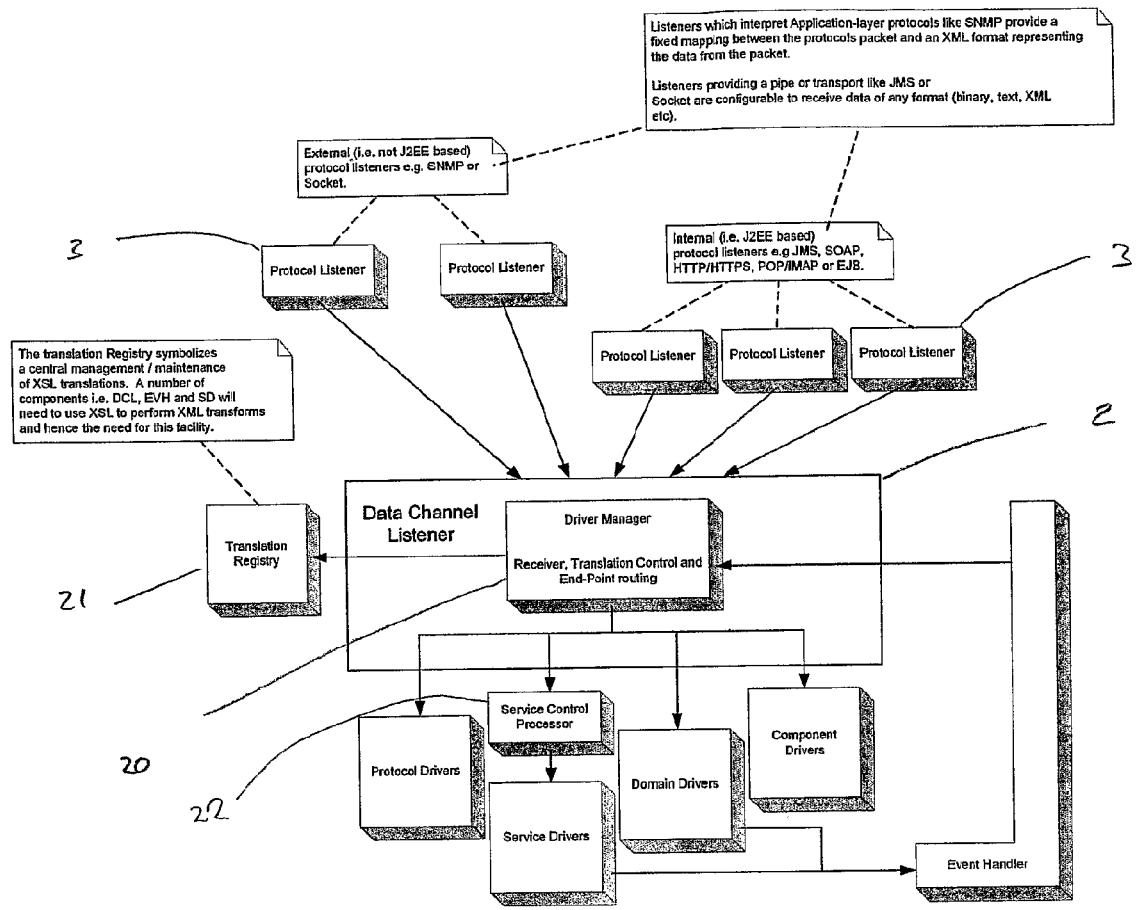
FIG. 2 shows an architecture of the service integration bus shown in FIG. 1

FIG. 2 shows the service integration bus in greater detail. As previously described the data channel listener 2 is a stateless session EJB instance that provides a J2EE entry point into the service integration bus for internal and external listeners 3 and drivers, thereby acting as a central connection within the bus. The data channel listener comprises a driver manager 20, which is used to assemble and integrate driver based applications. The driver manager is a singleton class which can be invoked from one or more EJB components in an application. The driver manager is adapted to abstract driver invocation so that no code changes are required to access new drivers as they are implemented. The driver manager is also adapted to facilitate straightforward and optimised translation between XML message formats if required. This allows driver XML schemas to be developed completely independently of the service integration bus's internal and external interfaces. The driver manager is XML schema-agnostic, thereby allowing it to be the core of both the data channel listener and the event handler 6, which has its own XML interface. In use, the driver manager also interacts with a translation registry 21, which schematically operates a central management and maintenance of XSL translations.

A driver is an EJB that publishes an XML API via a single Java method that is invoked from the service integration bus, for example by calls from the event handler 6 or the data channel listener 2. A driver accepts an XML document and returns an XML document in response and encapsulates a reusable functionality for a particular problem domain. This may range from communication over a protocol to a complex workflow logic such as the event handler. All access to a driver is via the Driver Manager 20, so that new components need only implement the interface with the driver manager and the addition of a driver requires no code changes.

In the exemplary embodiment of an automated provisioning system, four types of driver are provided, namely protocol drivers, component drivers, domain drivers and service drivers. A service control processor 22 is provided to act as a mediator and facade to service drivers via a number of features described in greater details with reference to FIG. 3.

The service driver is distinguished from other drivers such as the protocol and component drivers in a number of ways. The service driver has a more complex problem domain, and presents a higher-level interface. It is adapted to implement business logic to manage and provision a particular service. A service driver interacts with the model and may communicate with more than one protocol driver during execution of an operation. A service driver has a set of predefined operations common to all implementations. A service driver is adapted to use a reservation engine to allocate and lock resources.

Protocol drivers execute actions against a device by sending a message over a protocol. Supported operations will usually be an abstraction of a third-party protocol implementation. Protocols can be traditional protocols like SNMP or Telnet but also can be application protocols over traditional protocols like XML over HTTP.

Component drivers are drivers which do not really fit into any of the other three categories, but which implement the Driver interface for the sake of consistency and code reuse. Examples include the Event Handler, Service Control Processor and the Log Engine.

Domain drivers are similar to Service Drivers in that they implement a complex problem domain and present a higher-level interface. However they do not interact with the service control processor and hence are not required to implement the QVRPS flow and its associated operations. An example of a Domain Driver is the subscriber driver, which acts as billing abstraction layer, and handles all interactions to do with subscribers.

The event handler 6 provides a schedulable, retry and flow mechanism for calling driver operations. Service drivers can use it when interacting with protocol drivers. As the event handler can add an overhead to provisioning, it should preferably be used when there is some advantage in doing so such as where a driver operation should be re-attempted on failure, where multiple operations need to be combined into a single transaction, where an undo path is required, where scheduling of the operation is required r where a comprehensive audit trail is required.

Figure 3:
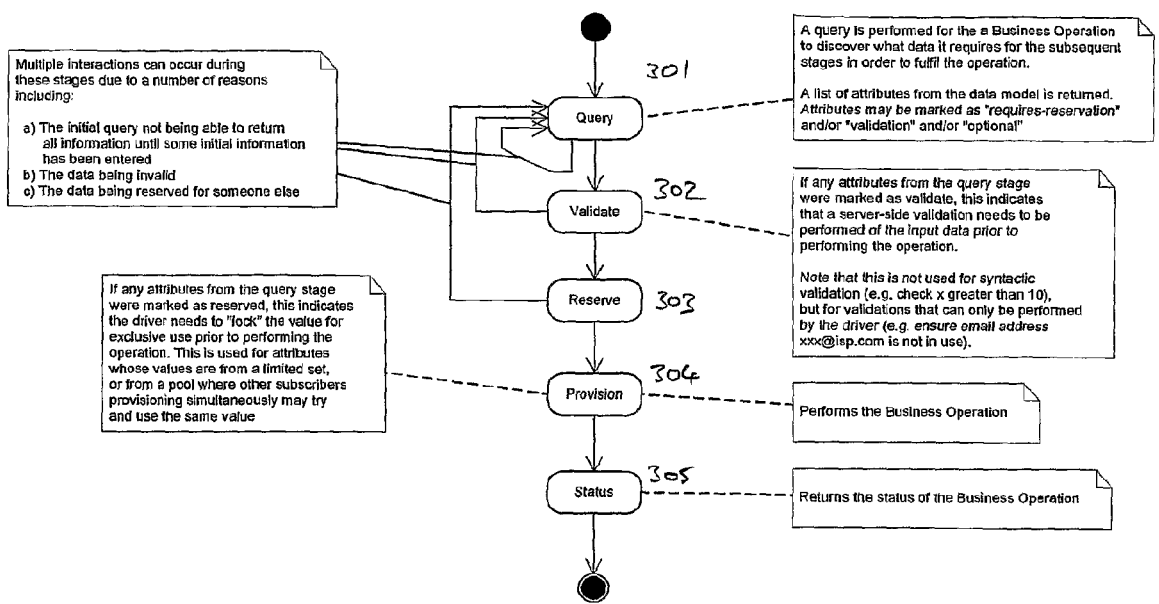
FIG. 3 shows a service control processor workflow

FIG. 3 shows a workflow process for the service control processor, which comprises five steps: query; validate, reserve; provision and status (QVRPS). The service control processor acts as a mediator and facade to service drivers via a number of features including the QVRPS flow for performing any type of driver business operation, decoration of driver attribute requirements with presentation information, sharing of attributes common to multiple drivers and auto population of driver attribute requirements from product and service configuration data. The service control processor and the Service Drivers co-operate to support the QVRPS flow. This is a standardized mechanism for each Business Operation that allows for dynamic inclusion of data and hence de-coupling of presentation logic from the back-end implementation. This greatly speeds up the provisioning process.

The service control processor places a number of requirements on the service drivers and the data model. A service driver is called via the service integration bus and contains a specific meta-object defining the request, which is specific to the service driver. The service integration bus then uses this to locate the driver by means of an attribute of a product-service configuration object in the data model. Service drivers implement a number of Business Operations, one for each function of the Service that is supported. Each service driver supports a describe-all operation to enumerate every business operation available and a describe operation to enumerate which business operations are available for a given subscriber and in appropriate cases a service identifier. The service drivers should also support the remaining sub-operations of query, provision and when appropriate validate and reserve for each respective business operation.

In step 301a query is performed for the Business Operation to discover what data it requires for the subsequent stages in order to fulfil the operation. A list of attributes from the data model is returned. Attributes may be marked as "requires-reservation" and/or "validation" and/or "optional".

In step 302, if any attributes from the query stage were marked as validate, this indicates that the driver needs to perform a server-side validation of the input data prior to performing the operation. Note that this is not intended to be used for syntactic validation (e.g. check x greater than 10), but for validations that can only be performed by the driver (e.g. ensure email address xxx@isp.com is not in use).

In step 303, if any attributes from the query stage were marked as reserved, this indicates the driver needs to "lock" the value for exclusive use prior to performing the operation.

By way of example, this is used for attributes whose values are from a limited set (e.g. telephone numbers), or from a pool where other subscribers provisioning simultaneously may try and use the same value (e.g. static IP addresses).

In steps 301, 302 & 303 multiple interactions can occur during each step for a number of reasons such as the initial query not being able to return all information until some initial information has been entered, the data being invalid or the data being reserved for someone else.

In step 304, the service control processor performs the business operation, such as providing a new e-mail address or adding a subscription to a new premium television channel. If any attributes from the query stage were marked as reserved, this indicates the driver needs to lock the value for exclusive use prior to performing the operation as indicated above.

Finally in step 305, the status of the business operation is returned. This is for use when the perform stage is implemented using a delayed or decoupled process, such as the event handler. Steps 302 and 303 may be omitted if no attributes require server side validation or reservation.

The drivers do not contain presentation related information but the service control processor permits the driver attributes to be decorated with extra information that specifies a group and numeric order, thereby allowing a presentation layer to display the attributes together in a logical manner with appropriate ordering.

Where an attribute is common to several drivers, for example a subscriber's surname, the service control processor can define a single common shared attribute in the place of several. This allows a presentation layer to request the attribute value once (e.g. sharedSurname) and then the service control processor propagates it to the respective drivers as required, using the relevant driver name for the attribute (e.g. mailSurname).

The Query sub-operation of each business operation reports all the data requirements for the operation to be performed. Some of this is usually "fixed" information that is stored in the product object, service object or product service configuration object of the data model. The service control processor can be configured to automatically populate attribute "A" of driver "B" with attribute "C" from object "D", where the object is any object in the model but more commonly one from the product, service or the configuration object linking the two.

The describe operation of a service driver can accept a number of parameters. The service driver uses this to determine the state of the subscriber and/or service; this in turn determines the Business Operations that are available for a given set of input data. A GUI can use this information to display a context-sensitive menu of options available.

EXAMPLE 1 given a subscriber identity and (via the service control processor the maximum number of accounts), the driver can determine whether the add-service-instance operation is available for that subscriber by checking how many accounts on the service the subscriber currently has.

EXAMPLE 2 given a subscriber identity and account identity, the driver can determine the state of the account and thus determine which of the disable-service-instance or enable-service-instance operations is available.

What is claimed is:

1. An automated provisioning system for provisioning a service or device in a communications network, the automated provisioning system comprising:
   a control processor comprising a hardware processor;
   a data store holding information on a plurality of operations that are available for a user;
   a listener adapted to receive a request from the user; and
   a driver adapted to control operation of at least one of a service and a device, the driver supporting a describe-all operation enumerating each of a plurality of operations implemented by the driver and further supporting a describe operation enumerating which of the plurality of operations are available for the user, and the driver co-operating with the control processor;
   wherein the control processor is adapted to mediate between the driver and the data store;
   wherein in response to a request to provision an available operation being received, the control processor mediates between the data store and the driver to determine what information is required to provision the at least one of the service and the device and to permit the driver to provision the at least one of the service and the device, and upon determining that a value for the requested available operation is reserved, the control processor instructs the driver to lock the reserved value prior to provisioning;
   wherein the control processor determines that the value for the requested available operation is reserved based on at least one attribute returned from a query being marked as reserved and indicating that the driver needs to lock the value for exclusive use prior to provisioning the requested available operation;
   wherein the control processor is operable such that the at least one attribute returned from the query is decorated with extra information specifying a group and a numerical order, and a presentation layer displays the at least one attribute together in a logical manner with appropriate ordering.

2. The automated provisioning system according to claim 1, wherein when the control processor determines that the requested available operation requires validation, then a server side validation of the request to provision the available operation is made prior to actual provisioning.

3. The automated provisioning system according to claim 1, wherein a status of the requested available operation is returned by the driver to the control processor.

4. The automated provisioning system according to claim 1, wherein the request to provision the available operation to the driver contains a meta-object specific to the driver which defines the request.

5. The automated provisioning system according to claim 4, wherein the information in the data store on the plurality of operations that are available for the user is modeled in a model comprising product objects and service objects and a configuration object linking the product objects and the service objects, wherein the control processor uses the meta-object to locate the driver by means of an attribute of the configuration object.

6. The automated provisioning system according to claim 1, wherein the listener adapted to receive the request from the user includes a driver manager for assembling and integrating driver based applications, the driver manager providing all access to the driver.

7. The automated provisioning system according to claim 1, wherein the driver publishes an API via a single method invoked from a service integration bus, the single method invoked from the service integration bus including calls from the listener.

8. The automated provisioning system according to claim 2, wherein the control processor determines that the requested available operation requires validation based on the at least one attribute returned from the query being marked as validate and indicating that the driver needs to perform the server side validation of the request to provision the available operation prior to provisioning the requested available operation.

9. The automated provisioning system according to claim 1, wherein when an attribute of the at least one attribute is common to the driver and at least one additional driver, the control processor defines a single common shared attribute in place of the attribute common to both the driver and the at least one additional driver, such that the presentation layer requests an attribute value of the single common shared attribute once and then the control processor propagates it to the respective drivers as required using a relevant driver name for the single common shared attribute.

* * * * *